Figure 1:
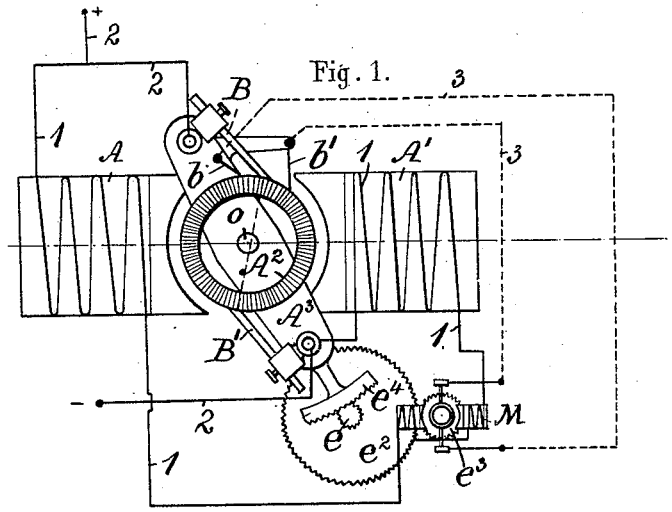

(No Model.)

R. THURY.
REGULATION OF DYNAMO ELECTRIC MACHINES.

No. 466,760. Patented Jan. 5, 1892.

Witnesses:
Hermann Bornmann.
Thomas M. Smith.

Inventor:
R. Thury
by J. Walter Douglass
att'y

THE NORRIS PETERS CO., PHOTO-LITHO., WASHINGTON, D. C.

UNITED STATES PATENT OFFICE.

RENÉ THURY, OF GENEVA, SWITZERLAND, ASSIGNOR TO CUÉNOD, SAUTTER & COMPANY, OF SAME PLACE.

REGULATION OF DYNAMO-ELECTRIC MACHINES.

SPECIFICATION forming part of Letters Patent No. 466,760, dated January 5, 1892.

Application filed August 4, 1891. Serial No. 401,708. (No model.) Patented in Switzerland December 31, 1890, No. 3,097.

*To all whom it may concern:*

Be it known that I, RENÉ THURY, a citizen of Switzerland, residing at Geneva, Switzerland, have invented certain new and useful Improvements in a System for the Automatic Regulation of the Position of the Brushes of Dynamo-Electric Machines, Magneto-Electric Machines, and Electric Motors, (for which I have obtained a patent in Switzerland, No. 3,097, of December 31, 1890;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates in general to dynamo-electric generators, machines, or motors, and more particularly to means for automatically regulating the lead of the collecting-brushes thereof.

In all dynamo-electric machines of the type to which my invention is applicable the collecting-brushes should contact with the respective extremities of a diameter on the commutator-cylinder, on one side of which the differences of potential produced by the movements of the coil through the magnetic field tend to produce a current in a direction opposite to that on the other side, and such a diameter is commonly called a "neutral line" or "diameter of commutation." This neutral line or diameter of commutation joins the neutral points where the collecting-brushes rest and would theoretically coincide with the center line of the space between the pole-pieces or free terminals of the field-magnets. However, in practice this neutral line is displaced in a greater or less degree in the direction of rotation of the armature both by the magnetic lag and by the distortion of the field of the machine due to the magnetization of the armature-current, so that in the operation of such machines it is desirable to move the collecting-brushes on the commutator-cylinder in order to accommodate them to the changing positions of the neutral line or diameter of commutation and thus diminish sparking and obtain the best output of energy from the machine. The angle through which the brushes are shifted is designated as the "lead" of the brushes, and in order to obtain the maximum efficiency of the machine this angle of lead should, for the reasons above stated, be constantly increased and diminished to compensate for the varying displacement of the neutral line or diameter of commutation.

The principal object of my present invention is to obtain automatically a precise and accurate adjustment of the collecting-brushes to the varying positions of the neutral line or line of commutation, and which object is attained by causing any differences of potential that may exist in the commutator-cylinder upon opposite sides of the center line of the space between the pole-pieces to control the movements of suitable mechanism for adjusting the collecting-brushes.

My invention consists in the improvements hereinafter described, and pointed out in the claim.

The nature and characteristic features of my present invention will be more fully understood from the following description, taken in connection with the accompanying drawings, forming part hereof, and in which—

Figure 3:
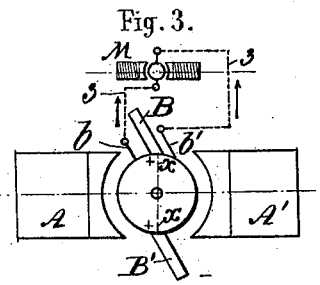
Figure 4:
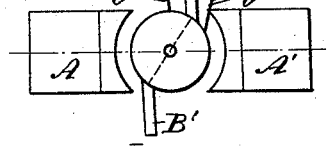
Figure 2:
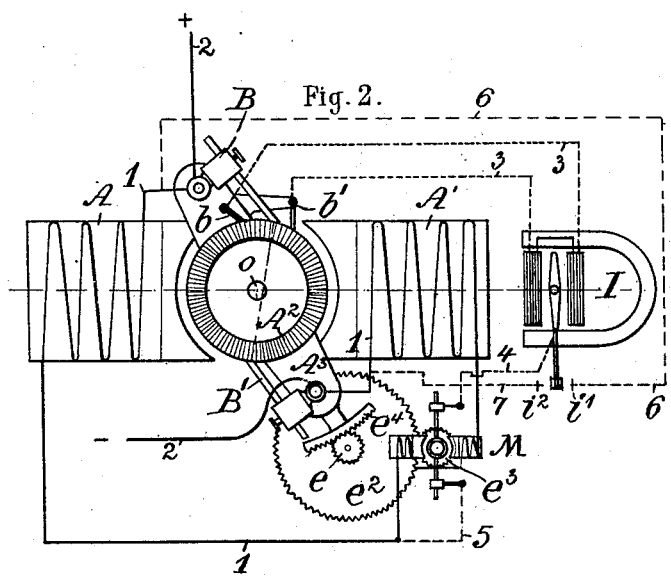
Figure 5:
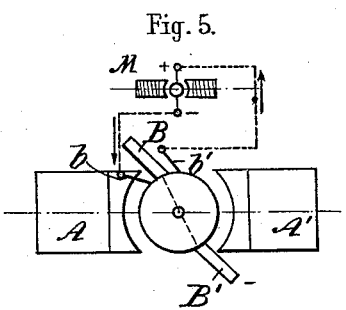

Figure 1 is a side elevation of the field-magnets, commutator-cylinder, and collecting-brushes of a dynamo-electric generator, machine, or motor, showing the collecting-brushes mounted upon a pivotal bar or brush-carrier and showing also auxiliary or telltale brushes mounted on said bar or brush-carrier and disposed upon opposite sides of one of the collecting-brushes and connected in circuit with an auxiliary motor adapted to automatically shift said bar or carrier and brushes. Fig. 2 is a similar view showing a polarized relay interposed in the circuit and connected with the collecting-brushes and adapted to control the auxiliary motor; and Figs. 3, 4, and 5 are diagrammatic views illustrating the changes in position of the telltale brushes corresponding to the changes in potential upon the respective sides of the center line of the space between the pole-pieces of the field-magnets, and also illustrating the direction of the current in the circuit connecting the tell-tale brushes and the auxiliary motor.

In the drawings, A and A' are the field-magnets.

$A^2$ is the commutator-cylinder.

$A^3$ is an arm or brush-carrier pivotally supported upon the axis $o$ of the armature (not shown) or in any other preferred manner.

B and B' are collecting-brushes carried by the arm or brush-carrier $A^3$ and properly insulated therefrom.

$b$ and $b'$ are tell-tale or auxiliary brushes mounted upon and insulated from the arm or brush-carrier $A^3$ and disposed the one in front of the collecting-brush B and the other in rear thereof, so that when the brushes B and B' are upon a neutral line or diameter of commutation there is no difference of tension or potential between the auxiliary or tell-tale brushes $b$ and $b'$; but as soon as any displacement of the neutral line or diameter of commutation occurs there exists a difference of potential between the tell-tale or auxiliary brushes, and this difference of potential is used to automatically set in motion mechanism for shifting the collecting-brushes B and B' into a position corresponding with the new position of the diameter of commutation or neutral line, whereupon the difference of potential between the tell-tale brushes ceases to exist, and therefore the motion of the mechanism for shifting the collecting-brushes also automatically ceases. Of course the difference of potential between the auxiliary or tell-tale brushes $b$ and $b'$ may be utilized to control the motion of a great variety of mechanism for shifting the brush-carrier or arm $A^3$, and with it the brushes. However, I shall proceed to describe an electrical appliance for accomplishing this result, also a modification of such device.

M is an electric motor having its armature provided with a pinion $e^3$, adapted to mesh with a gear-wheel $e^2$, which latter is provided with a driving-pinion $e$, and this pinion $e$ engages a toothed segment $e^4$, connected with the brush-carrier or arm $A^3$, so that the rotation of the armature of the motor M causes the above-mentioned train of gears to shift the brush-carrier or arm $A^3$ in one direction or the other, according to the direction of rotation of the armature of the motor M.

Referring now to Fig. 1, the field-magnets A and A' are energized or excited by a shunt-circuit 1 and the main or line circuit is indicated by the conductors 2. The shunt-circuit 1 also includes the coils of and serves to excite the field-magnets of the motor M. 3 is a closed circuit connecting the two tell-tale or auxiliary brushes $b$ and $b'$ and including the coils of the armature of the motor M.

Referring now to Fig. 3, the collecting-brush B contacts with the diameter of commutation or neutral line $x\,x$, and hence the potential of the brushes $b$ and $b'$ is equal. Therefore no current passes through or traverses the coils of the armature of the motor M, and consequently the latter remains at rest. If, however, the diameter of commutation or neutral line $x\,x$ becomes displaced in the direction of rotation of the hands of a watch, as shown in Fig. 4, then the potential of the tell-tale brush $b$ exceeds that of the tell-tale brush $b'$ and gives rise to a current in the circuit 3, which flows in the direction indicated by the arrows and causes the armature of the motor M to be rotated toward the right, and this rotation of the armature causes the train of differential gears to shift the arm $A^3$ in a similar direction, so that the collecting-brush B is displaced toward the right until it again contacts with the neutral line or diameter of commutation, whereupon the difference of potential between the two auxiliary brushes $b$ and $b'$ ceases to exist, and hence the armature of the motor M comes to rest. If the neutral line or diameter of commutation $x\,x$ should be shifted toward the left, as shown in Fig. 5, then the potential of the auxiliary brush $b'$ would exceed that of the brush $b$, and the current would consequently flow through the circuit 3 in a direction reverse to that in which it traveled in Fig. 4, and this reverse current causes the armature of the motor M to be rotated left-handed and to shift the collecting-brush B toward the left until it rests upon one extremity of the diameter of commutation or neutral line $x\,x$, whereupon the movement of the motor ceases in precisely the same manner as has been already described with reference to Fig. 4. Thus it will be understood that the collecting-brushes are at all times automatically adjusted to the neutral line or diameter of commutation.

The construction and mode of operation of the modification of the invention shown in Fig. 2 are the same as above described with reference to Fig. 1, with the following exceptions: The circuit 3 is utilized to control a polarized relay I, the object being to obtain a more accurate adjustment of the collecting-brushes. The tongue of the relay is connected with one of the brushes of the motor M by a conductor 4. The other brush of the motor M is connected with the circuit 1 by a conductor 5, located between the motor M and the positive brush B of the dynamo. One stop $i'$ of the relay I is connected with the circuit 1 by a conductor 6 on the positive side of the motor M—that is, on the side nearest the positive collecting-brush B of the dynamo-machine—and the other stop $i^2$ of the relay is connected with the circuit 1 by a conductor 7 on the negative side of the motor. Of course the reversals of current in the circuit 3 cause the tongue of the relay to be shifted into contact with the stop $i'$ or $i^2$. When the tongue of the relay is in contact with the stop $i'$, the circuit traverses the conductors 1 5 4 6 1 and the armature of the motor rotates in one direction, whereas when the tongue of the relay is shifted into contact with the stop $i^2$ the current traverses the conductors 1 5 4 7 1 and the armature of the motor is rotated in a reverse direction, and thus the direction of motion of the armature of the motor is reversed and causes the adjustment of the collecting-brushes in the manner hereinabove explained.

It will be obvious to those skilled in the art to which my invention appertains that modifications may be made in the details thereof. For example, the collecting-brushes of the dynamo may be adjusted independently. Hence I do not limit myself to the exact construction and arrangement of parts hereinbefore described; but,

Having thus described the nature and objects of my invention, what I claim as new, and desire to secure by Letters Patent, is—

In combination, a dynamo-electric machine, generator, or motor provided with a rotatable arm or brush-carrier, collecting-brushes and auxiliary brushes applied to said arm or brush-carrier, an auxiliary electric motor, differential gearing between said auxiliary motor and arm or brush-carrier, a relay for controlling said auxiliary motor, and circuit connections between said auxiliary or tell-tale brushes and relay, substantially as and for the purposes set forth.

In testimony whereof I affix my signature in presence of two witnesses.

RENÉ THURY.

Witnesses:
ERNEST SAUTTER,
G. PRENTICE NAYLOR.